Sept. 27, 1932.  J. T. SCHAAFF  1,879,529
PERFORATED CARD CONTROLLED MACHINE
Filed Nov. 10, 1930  9 Sheets-Sheet 1

Inventor
John T. Schaaff
By his Attorney

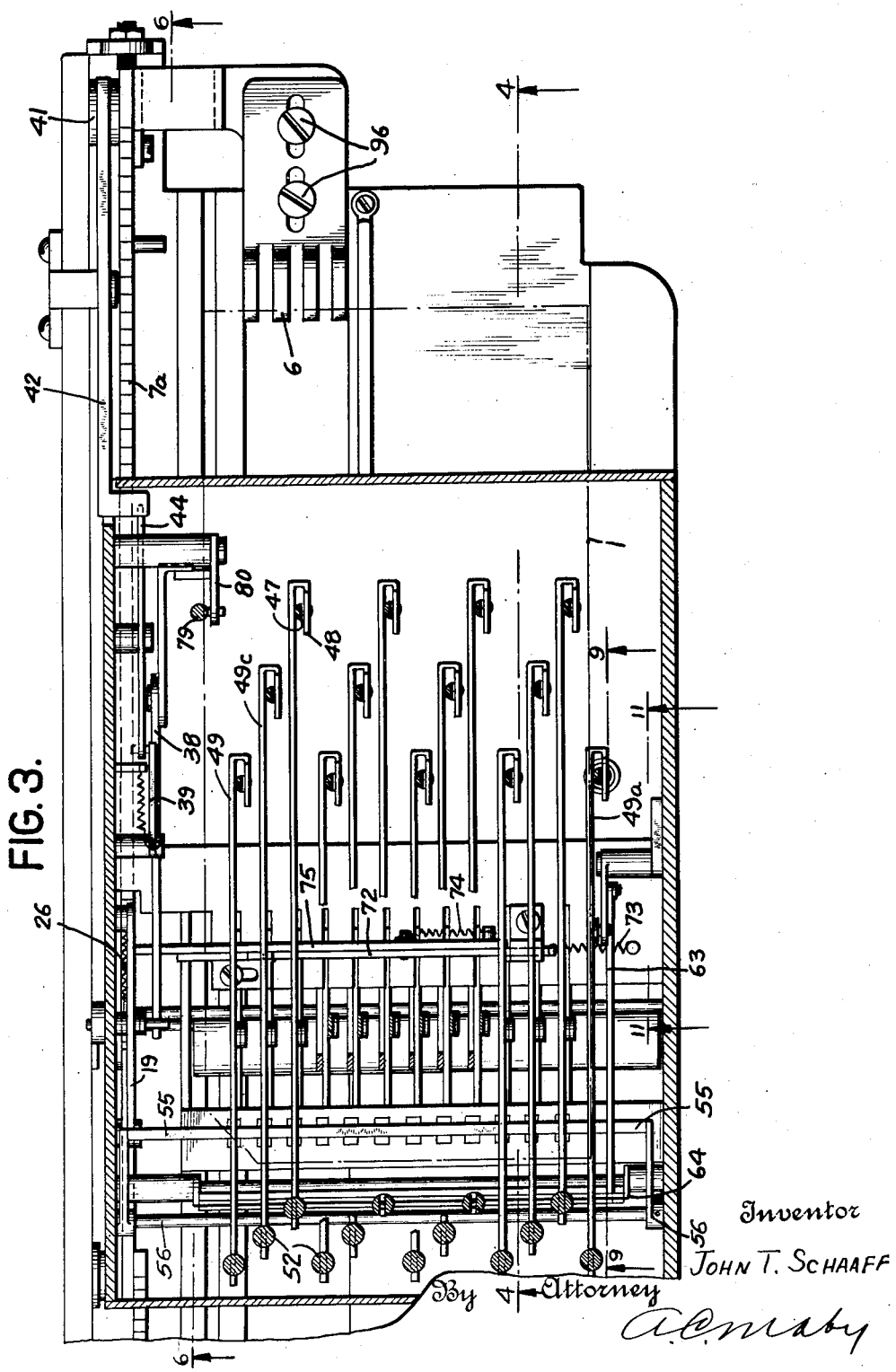

Sept. 27, 1932.    J. T. SCHAAFF    1,879,529
PERFORATED CARD CONTROLLED MACHINE
Filed Nov. 10, 1930    9 Sheets-Sheet 3
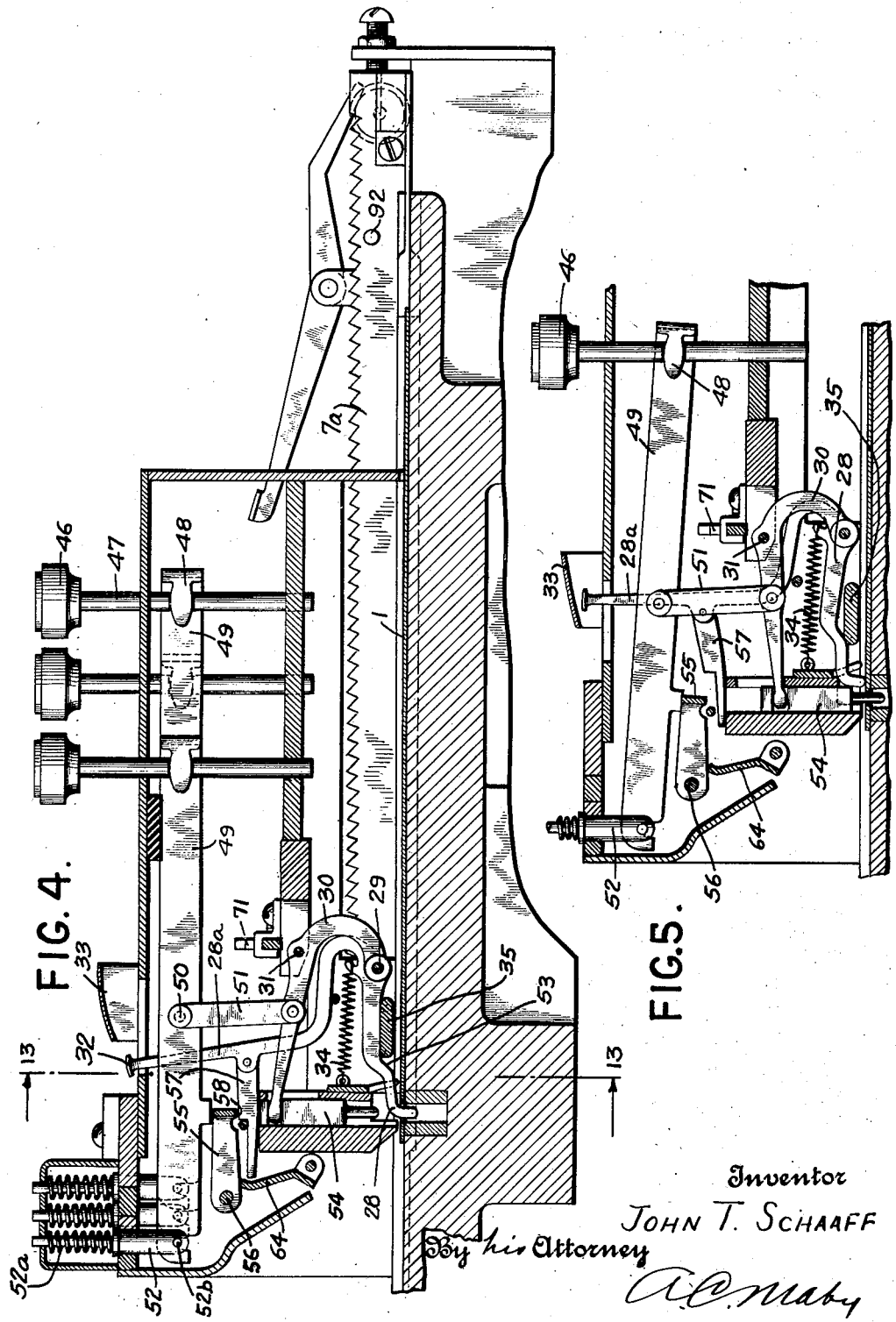
Inventor
JOHN T. SCHAAFF
By his Attorney

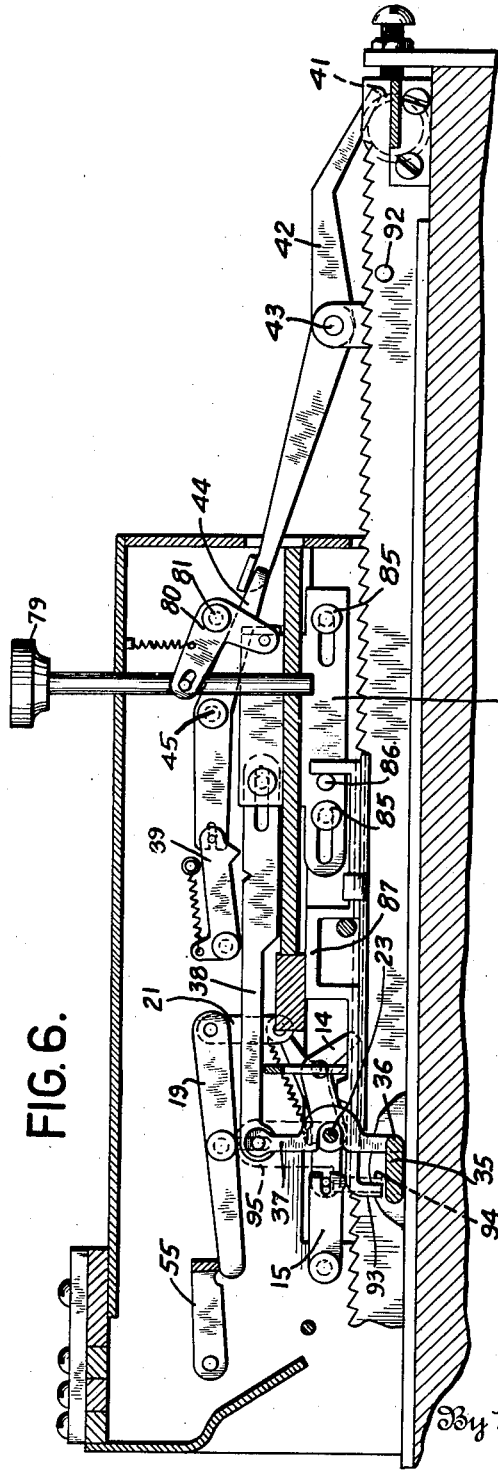

Sept. 27, 1932.   J. T. SCHAAFF   1,879,529
PERFORATED CARD CONTROLLED MACHINE
Filed Nov. 10, 1930   9 Sheets-Sheet 5
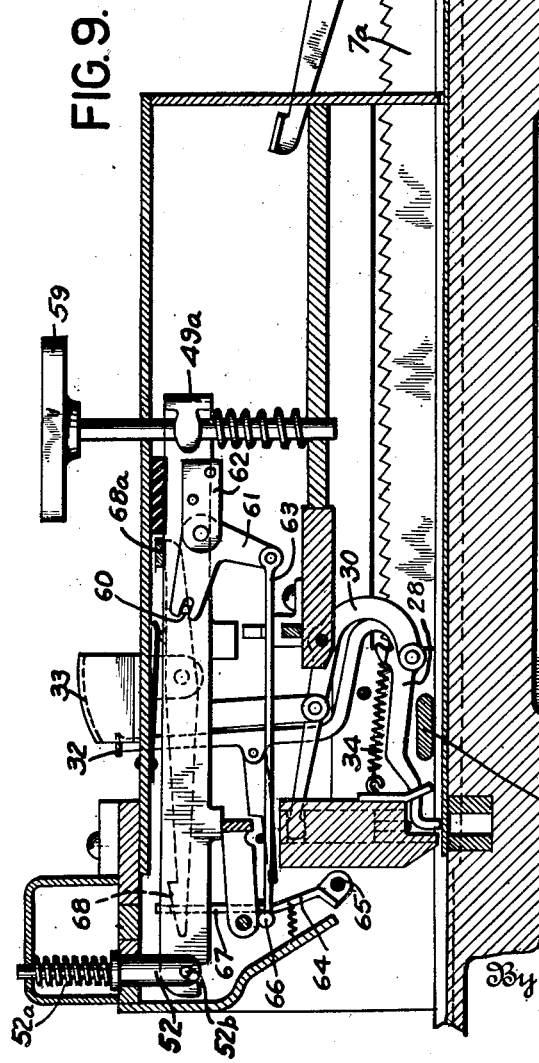
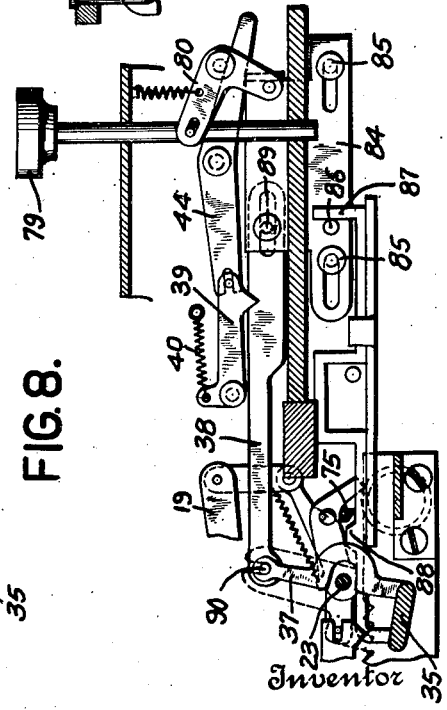
Inventor
JOHN T. SCHAAFF
By his Attorney Sept. 27, 1932.   J. T. SCHAAFF   1,879,529
PERFORATED CARD CONTROLLED MACHINE
Filed Nov. 10, 1930   9 Sheets-Sheet 6
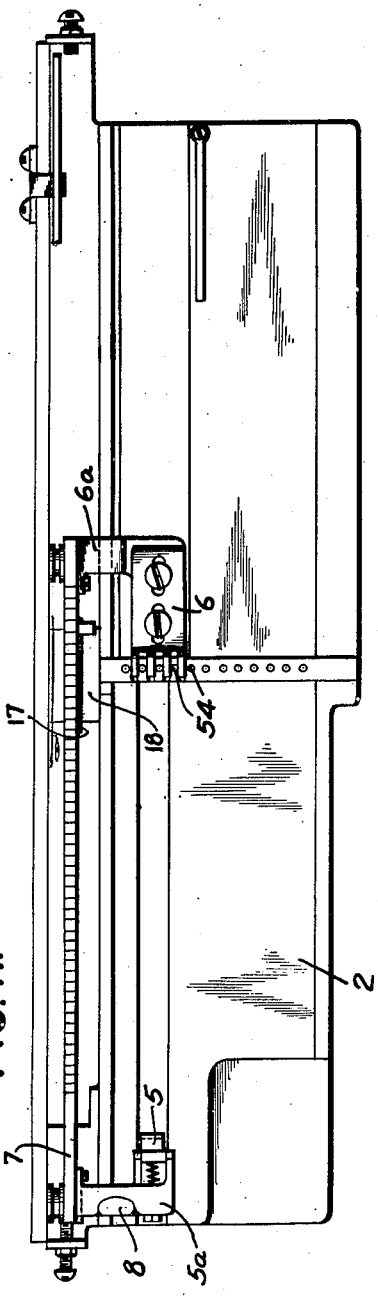
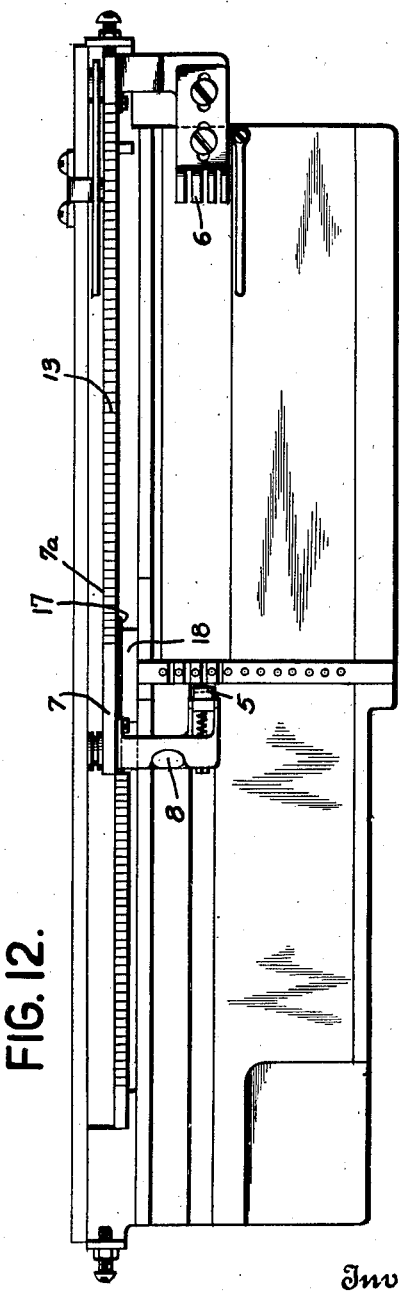
Inventor
John T. Schaaff
By his Attorney

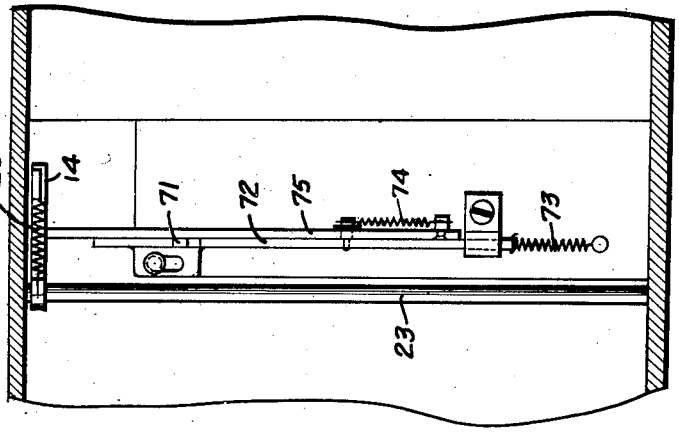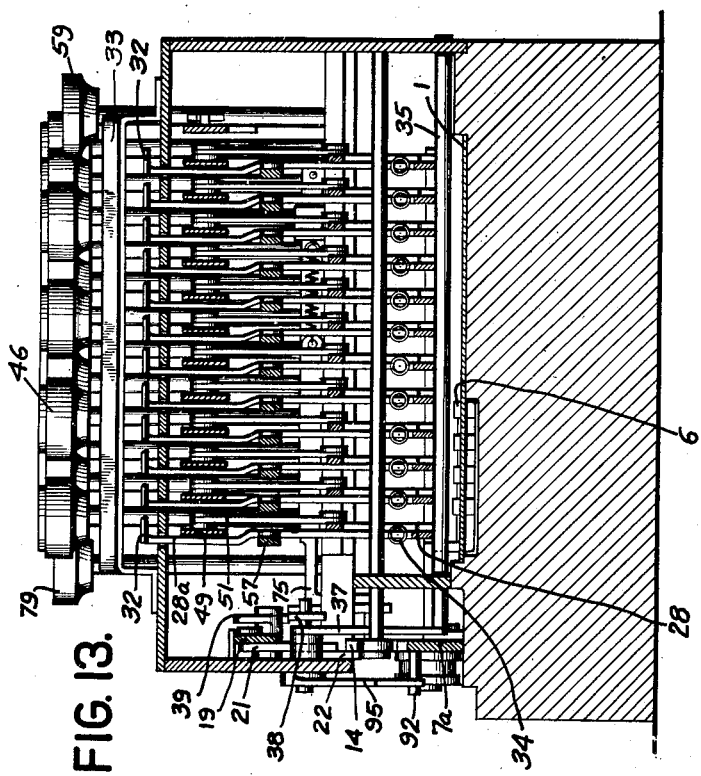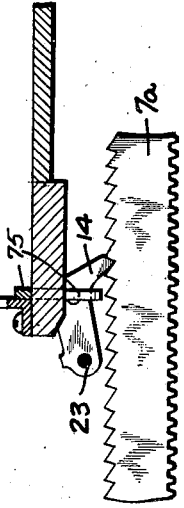

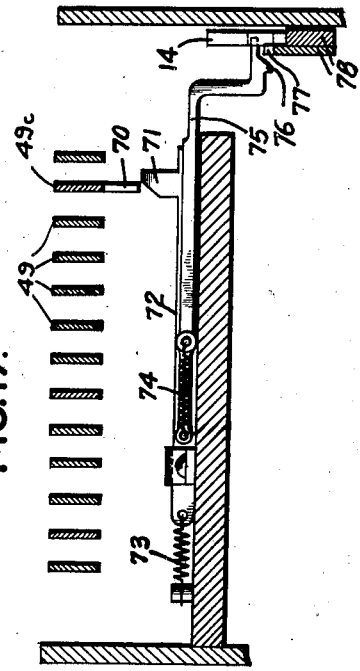
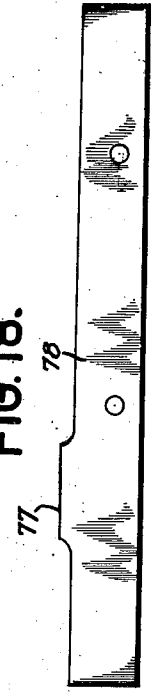
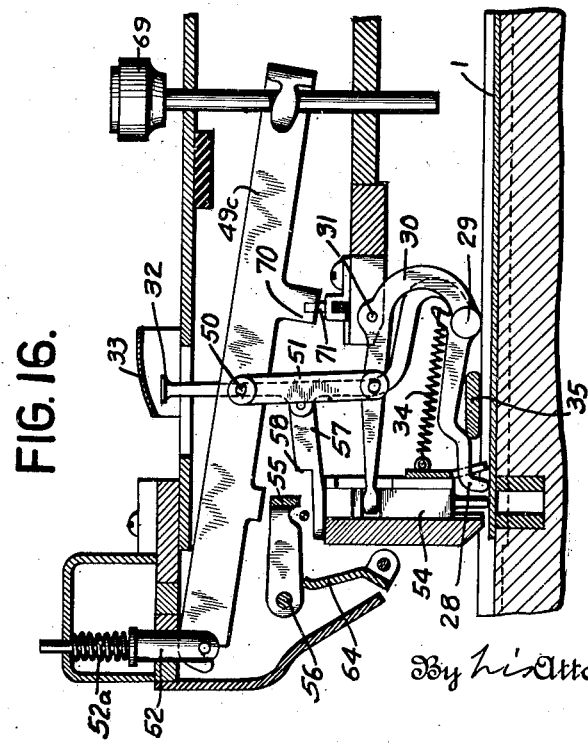
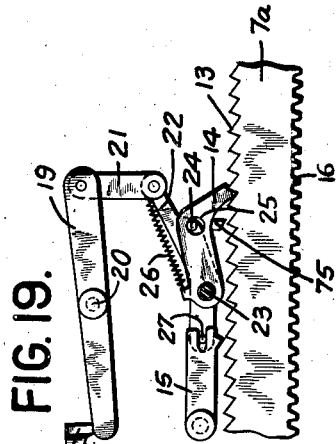

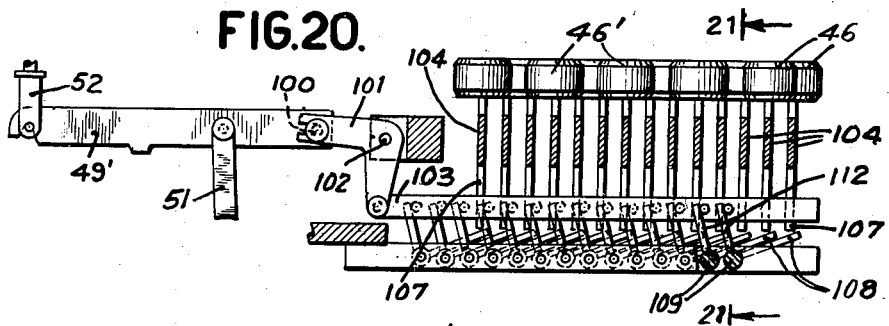
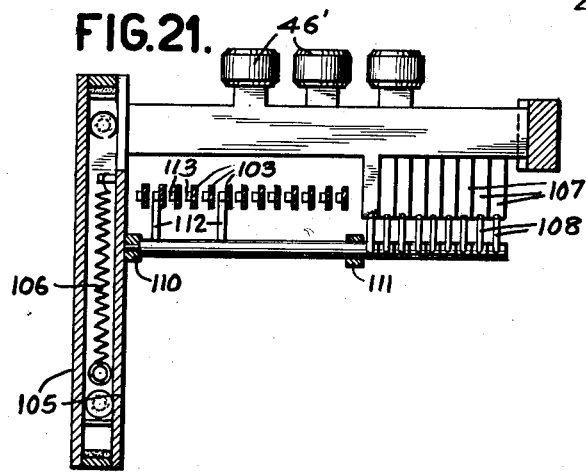
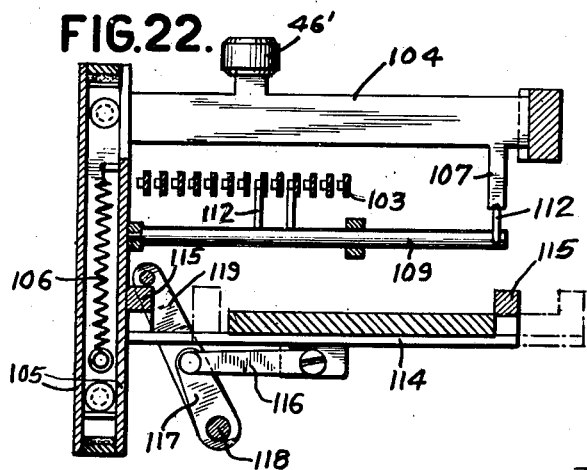

Patented Sept. 27, 1932

1,879,529

UNITED STATES PATENT OFFICE

JOHN THOMAS SCHAAFF, OF WASHINGTON, DISTRICT OF COLUMBIA, ASSIGNOR TO THE TABULATING MACHINE COMPANY, OF NEW YORK, N. Y., A CORPORATION OF NEW JERSEY

PERFORATED CARD CONTROLLED MACHINE

Application filed November 10, 1930. Serial No. 494,607.

This invention relates to perforated card verifying machines and more particularly to a machine adapted to verify one or more perforations in each column of a perforated record card. In my Patent No. 1,426,223 dated August 15, 1922, I disclosed a machine for verifying the perforations in a record card, in which the depression of a key corresponding to a perforation in the column being verified causes the card to move one column to the left so as to present the next column for verification. The machine there disclosed is essentially adapted to the verification of one perforation in a column. In order to verify a plurality of perforations in a single column, it is necessary in the disclosure of said patent to depress a key corresponding to one of the perforations and at the same time to suppress the feeding of the card so that another key representing another perforation may be subsequently depressed.

One of the objects of the present invention is to devise a machine for verifying one or more perforations in each column of a record card wherein, if a single perforation appears in the column being verified, the depression of a key corresponding to this particular perforation will cause the card to feed one step to present the next column for verification, but where more than one perforation appears in the column being verified, depression of the several keys corresponding to the several perforations must be effected simultaneously in order to cause the card to feed, or a key correspoding to one of the several perforations may be depressed along with the depression of a space key to effect feeding.

Another object is to devise a machine in which, as the card is fed column by column, visible indicators are adapted to show which points in the column being verified have perforations. Thus, an operator may either verify the entries in a card by simply depressing the keys as if he were punching a card or he may read visible indications and simply depress the space key to effect feeding of the card to present the next column for verification.

Referring to the drawings, Fig. 1 is a plan view of the machine embodying my invention;

Fig. 3 is a sectional plan view taken on line 3—3 of Fig. 2;

Fig. 4 is a sectional detail taken on line 4—4 of Fig. 3 showing the operating keys and the means for sensing perforations in the card;

Fig. 5 is a detail showing one of the keys and the perforation sensing devices in different position from that shown in Fig. 4;

Fig. 6 is a sectional elevation taken on line 6—6 of Fig. 3 showing a release key and mechanism controlled thereby for releasing the card carriage to permit the latter to move its full distance to the left;

Fig. 7 is a detail of mechanisms shown in Fig. 6 with the parts in different positions;

Fig. 8 shows the mechanism of Fig. 7 after the release key has been permitted to rise and showing the parts locked in the position to which they were moved by depression of the key;

Fig. 9 is a sectional elevation taken on line 9—9 of Fig. 3 showing the space key and mechanism operated thereby;

Fig. 10 is a detail of mechanisms shown in Fig. 9 with the space key in depressed position and the associated mechanisms in correspondingly moved positions;

Fig. 11 is a plan view of the machine with the keyboard and verifying mechanisms removed and showing the card carriage in its position at the extreme left of the machine;

Fig. 12 is a view similar to Fig. 11 with the card carriage at the extreme right end of the machine;

Fig. 13 is a side sectional elevation taken on line 13—13 of Fig. 4 showing the keys and the arms rocked thereby as well as the visible perforation indicators;

Fig. 14 is a detail of the card supporting carriage escapement mechanism;

Fig. 15 is a detail of mechanism for releasing the carriage from the escapement pawls;

Fig. 16 is a detail showing the skip key and mechanisms operated thereby for releasing the card supporting carriage to permit it to feed the card a distance of several columns all at once; it also shows the positions taken by the parts when there is no hole in the particular position in the card.

Fig. 17 is a detail showing the card skip mechanism;

Fig. 18 is a detail of a card skip bar adapted to be attached to the escapement rack to determine which columns shall be skipped when the skip key is depressed;

Fig. 19 is a detail of the escapement mechanism.

Figs. 20 and 21 show modifications of the machine adapted to verify a plurality of perforations at a time.

Fig. 22 is another modification for verifying combinations of perforations.

Figure 1:
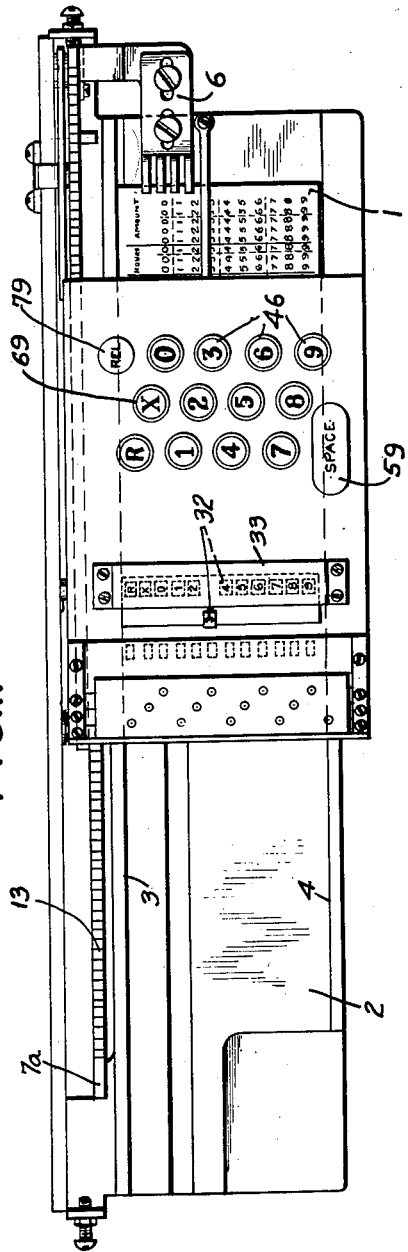

The machine disclosed is similar in appearance to the well known Hollerith card perforating machine. The cards used in the Hollerith system are normally provided with a plurality of vertical columns of index point positions, there being 10 regular positions arranged in value from zero up to nine in each column. A perforation in any particular position represents the value associated with that position. There are also two additional positions above the ten regular positions These addtional positions are known as the eleven or X position immediately above the zero position and the R or 12 position above the X position. In the Hollerith perforating machine a card having say 45 such columns is placed in the machine at the left end thereof. The carriage is then moved to the extreme right and carries the card under a row of punches so that the first column from the left of the card is directly under the punches, one punch for each index point position. Depression of one of the 12 keys actuates the punch of the corresponding value to perforate the card at the index point position corresponding to such value.

As the key is released the escapement mechanism permits the carriage to move one column to the left under the action of a spring drum to present the next column under the punches ready for perforation. Depression of another key of the same or another value repeats the operation of punching the card and causing it to step another column to the left and so on. According to my invention, the machine is similar in appearance, as stated, to a Hollerith perforating machine. A card having already been perforated and which is now to be verified, is placed in the machine at the left hand end. The carriage is then moved toward the right until the first column on the card rests directly below a column of dummy punches and perforation feeling fingers. An operator reading from the same list from which the cards were prepared depresses the same keys in succession that were depressed when the card was being punched. As each key is depressed, if the correct perforation appears in that column on the card the mechanisms will sense the perforation and upon the release of the key will release the carriage to permit it to move one column to the left. If the operator depresses the wrong key or if the correct perforation does not appear in the particular column on the card the carriage will not be released. The operator may then glance at the visual indicator and thus ascertain which position is perforated in that particular column. In this way, cards that have been incorrectly punched may be detected. It is sometimes desirable to perforate a card in two or more positions in a single column to represent a particular value such as a letter of the alphabet. Where two or more perforations appear in a single column depression of a key corresponding to one of the perforations will not cause the carriage to feed as the feelers controlled by the other perforations prevent the feeding mechanism from operating. In order to effect feeding, it is therefore necessary to depress each key corresponding to the perforations; or the operator may depress one of the keys and at the same time depress the space key instead of the other key, or he may visually read the indications showing the perforations in the column and then depress the space key to effect feeding.

Figure 2:
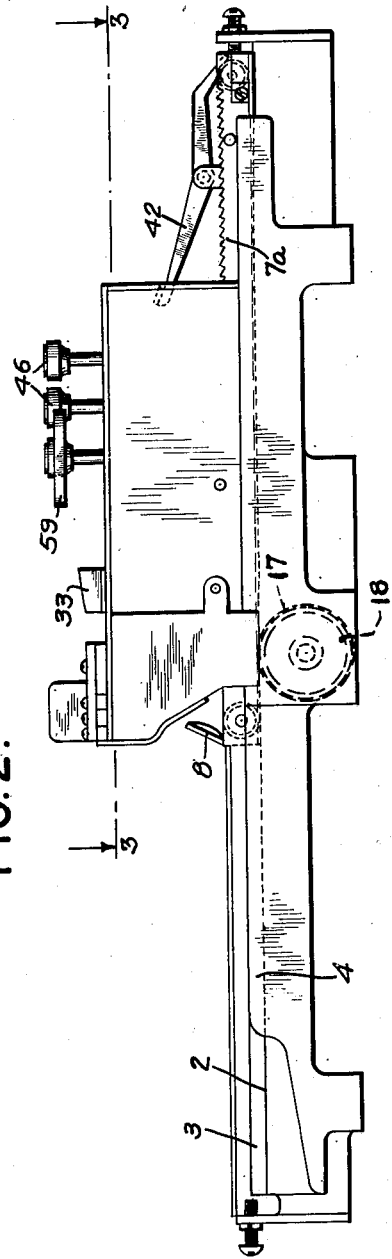
Fig. 2 is a front elevation of the machine.

Referring to Fig. 1 the card 1 having been placed on the card table 2 at the left end of the machine between the upper and lower guides 3, 4 is held at its ends by fingers, 5, 6 (see also Fig. 11). The fingers 5 and 6 are attached by brackets 5a, 6a to a rack and ratchet bar 7a. All of these parts constitute the card carriage 7. The operator presses the projections 8 fixed to the carriage to move the carriage to the right to the position of Figs. 1, 2 and 12.

The rack bar 7a of the card supporting carriage is provided with ratchet teeth 13 which as shown in Fig. 19 cooperate with the escapement pawls 14, 15. When the carriage is moved to its extreme position to the right the pawl 14 will hold it in this position. The lower edge of bar 7a is provided with rack teeth 16 meshing with a gear 17 (Fig. 2) associated with a spring drum 18. As the carriage is moved to the right the spring is compressed and thereafter tends to move the carriage back toward the left but is normally prevented from doing so by escapement pawl 14. In Fig. 19 the rocking of arm 19 about its pivot 20 in a counterclockwise direction raises the link 21 thus rocking arm 22 counterclockwise on its pivot 23. This arm is provided with a pin 24 cooperating loosely in a hole 25 in pawl 14. A spring 26 tends to hold the pawl in cooperation with the ratchet teeth 13. The raising of arm 22 lifts the pawl out of the ratchet teeth. At the same time a pin 27 carried by the rear end of arm 22 and cooperating in a slot with pawl 15 lowers this pawl into engagement with ratchet teeth 13 to prevent the carriage from being moved to the left at this moment. The pawl 14 is loosely mounted on the stud 23 so that when it is lifted out of the ratchet teeth, it will be thrown toward the right as viewed in Fig. 19 by the spring 26. Now, when the arm 19 is released to rock clockwise the pawl 14 will be lowered into cooperation with the ratchet teeth and will enter to the right of the tooth with which it last cooperated.

The pawl 15 will at the same time be lifted out of cooperation with the ratchet teeth and the spring drum will now move the carriage to the left until the pawl 14 cooperating with the next tooth stops it. The carriage will thus have moved one step to the left feeding the card so as to move the next column of perforations or perforation index point positions under the perforation sensing elements. When the carriage is moved to the extreme right the first column on the card will be in position for verification as shown in Fig. 4. When in this position, wherever a perforation appears in the column, one of the feelers 28 will project through the perforation. There are 12 of these feelers, one for each index position. Each feeler is pivotally mounted at 29 on an arm 30 which in turn is pivotally mounted at 31 to a fixed part of the machine. An upwardly extending arm 28a of each finger 28 is provided with a tab 32. All of these tabs are normally hidden beneath a shield 33 (see Figs. 1 and 4). When one of the feelers follows through a perforation and rocks about its pivot 29 the tab moves from under the shield 33. These tabs carry a mark thereon indicating the value of the perforation into which the feeler has fallen. In the present instance the perforation in the card being in the 3 position the indicator tab 32 which has moved into view of the operator shows value 3. A spring 34 connected to the feeler 28 serves to press the latter against the card and through the perforation when one appears. Passing under all of the feelers is a bar 35 pivoted at its ends 36. An arm 37 fixed to the bar 35 is connected by pin and slot at its upper end to a link 38 which, when the card is being inserted, is locked in its right hand position by a latching pawl 39 actuated by spring 40. In this position the bar 35 holds all of the feelers 28 above the card so that they will not interfere with the movement of the card into position. When the card carriage reaches the right hand end of the machine a roller 41 mounted on the carriage engages and rocks an arm 42 about its pivot 43, thus depressing the right end of an arm 44 pivoted at 45.

The left end of this arm has pin and slot connection with the latching pawl 39. The pawl is thus removed from the link 38 as soon as the card carriage reaches its right hand position. All of the springs 34 acting upon their several feelers 28 then rock the latter downwardly, restoring the bar 35. The feeler fingers 28 move downwardly until they rest upon the surface of the card and those that find perforations pass through the latter to the position shown in Fig. 4. When the parts are in this position the operator now reading from the same list from which the card was originally perforated, operates the machine by depressing the keys as if perforating the card. With the parts in the position of Fig. 4 and assuming that the column has been punched correctly, the operator depresses the key 46 representing the value 3. Each key 46 is provided with a shank 47 having a notch in its side into which the projection 48 of an arm 49 reaches. The depression of a key thus lowers the right end of the arm 49. The arm 49 is connected at 50 to a link 51 which is in turn pivotally connected to the arm 30. Arm 49 is also pivotally connected at its left end to a spring controlled plunger 52. The pivotal point 52b normally tends to act as the fulcrum to the arm 49 when depressed and the arm tends to move the link 51 downwardly, rocking the arm 30 about its pivot 31. This will pull the finger 28 which has reached through a perforation in the card to the right. The cam surface 53 on the feeler will ride up over the bar 35 and the finger will thus be lifted out of the perforation in the card and moved to one side thereof as in Fig. 5. Also the rocking of the arm 30 will through its connection with a dummy punch 54, move the latter downwardly as in Fig. 5 into the perforation in the card from which the feeler 28 has been removed. The rocking of arm 49 downwardly about pivot 52b also depresses the escapement bail 55 rocking the latter about its pivot 56.

The other end of this bail, as shown in Figs. 3 and 19, reaches over the left end of the arm 19 and when the bail is rocked downwardly, it rocks the arm 19 to operate the escapement pawls so that the card will step one column to the left to present the next column of perforations in position for verification. The escapement as we have seen takes place after the arm 19 has been released to move the pawl 14 into cooperation with the ratchet teeth. Thus the escapement of the carriage does not take place until after the dummy punch has been withdrawn from the perforation in the card. This, of course, all takes place after the operator releases the key and permits the parts to return to their normal positions. The releasing of the key also permits the feeler finger 28 to move back to the left and away from the bar 35 so that it may drop into a perforation if it finds one in the next column. All of the other feelers 28 in the meantime have rested, under the action of their springs 34, on the surface of the card and as the card moves one column to the left those that find perforations in the next column will drop into such perforations.

If the operator depresses a key 46 representing a perforation that should appear in the column being verified and the perforation is not there, then, as shown in Fig. 16, as the arm 30 commences to descend, it will move the finger 28 to the right out from under the dummy punch 54 and the latter will be depressed until it engages the card. The punch will then stop and prevent the link 51 from being depressed any farther. The connecting point 50 between the link 51 and the arm 49 will now become the fulcrum of the arm and as the key continues to be depressed, the left end of the arm 49 will raise the plunger 52 against the action of its spring 52a. Spring 52a is of sufficient strength to normally hold the plunger in the position of Fig. 4 but is not too strong to yield when the punch 54 rests upon the card. Thus, the spring will not cause dummy punch 54 to be pressed through the card. When the point 50 becomes the fulcrum of the arm 49 the left end of the arm does not depress the escapement bail 55 and the carriage is not released to move to the left.

When the operator notices that the escapement of the carriage has not taken place he will then look to see whether he has depressed the proper key or whether it is the absence of a proper perforation that has prevented the escapement operation. Also by observing the visible indicator tab 32 of Fig. 1 he will at once know which perforation appears in the particular column. If the perforation is incorrect the card may be removed and a new one punched to take its place. If there is no indicator 32 visible the operator will know that there is no perforation in that column. As shown in Fig. 4, when the feeder drops into a perforation in a card and the arm 28a rocks to the left, it will move a locking finger 57 so as to present a shoulder 58 under the escapement bail 55. If there are two perforations in a column the two corresponding locking fingers 57 will be moved in this manner under the bail 55. It is then necessary to depress the two corresponding keys 46 to move both of the locking fingers 57 to the right as in Fig. 5 before the arm 49 can depress the bail 55. Should the operator depress only one of the two keys the parts associated with the key thus moved will take the positions of Fig. 5 excepting that the arm 49 upon reaching the bail 55 will be stopped by the bail which in turn rests upon the shoulder 58 on the locking finger 57 associated with the other perforation and corresponding with the other key which the operator should have depressed but failed to do so. Where the arm 49 is prevented from depressing the bail 55 the bail will then act as the fulcrum for the arm 49 and the spring 52a will yield.

By depressing both keys representing perforations in the column both of the corresponding locking fingers 57 will be withdrawn from under the bail 55 and the two arms 49 pressing upon the bail will rock the latter downwardly to effect escapement of the carriage in the usual manner. The escapement is the indication to the operator that the perforations are correct. It is, of course, to be understood that in operating the verifier the operator upon reading a character on the list from which he is making his verification must upon reading a character which is represented by two or more perforations, readily recognize the perforations representing the character so that he can quickly depress the two keys simultaneously corresponding to these perforations.

Where there are more than two perforations in a column it will of course be necessary to depress all of the keys representing such perforations in order to effect escapement of the carriage, excepting that it is of course possible to depress the space key, which will presently be described, to effect the escapement. And an operator may of course prefer this method of operation where more than one operation appears in a column. In operating the machine in this way, it will be necessary to read the indicator tabs 32 to see that the proper holes appear in a column before depressing the space key.

*Space key*

The space key is shown at 59 (Figs. 9 and 10). The arm 49a associated with this key is connected by pin and slot at 60 to a bell crank 61 pivotally carried by bracket 62 fixed to the frame of the machine. The bell crank is connected to a wire 63 reaching to the left through a rocking plate 64 pivoted at 65. The wire 63 is provided with an enlarged end 66 so that when moved to the right, it will rock the plate 64 clockwise upon its pivot. Depressing of the space key rocks the bell crank 61 counterclockwise, moving the wire 63 to the right and rocks the plate 64 clockwise against the ends of locking fingers 57. As seen in Fig. 10 if the plate 64 is rocked clockwise, it will move the finger or fingers 57 under the bail 55 to the right, lifting the corresponding feelers 28 out of the perforations in the card so that the card will be free to move. The plate 64 is provided with an upward projection 67 adapted when moved to the right to be latched in this position by a latch 68 as shown in Fig. 10. This will hold the feeler fingers above the card until after the escapement has taken place. The arm 49a through its projection 49b effects the depression of the bail 55 to operate the escapement mechanism. After the space key is released and returns to its upper position it engages a flange 68a on latch 68, rocking the latter to release plate 64.

Skip key

If certain columns on the cards are not to be verified, the carriage may be caused to skip over such columns by depressing the skip or X key 69 (Figs. 1 and 16). This key is associated with the arm 49c (Fig. 17) which is provided with a depending projection 70. The projection is adapted to engage the cam member 71 carried by a slide 72 (see also Fig. 15). This moves the slide to the right against the action of its spring 73. Slide 72 is connected by a spring 74 to another slide 75 reaching under the pawl 14. The slide 75 is provided with a cam portion 76 adapted to cooperate with a raised portion 77 on a plate 78 attached to the side of the rack bar 7a. The width of the portion 77 is equal to the number of columns on the card to be skipped. The left end of portion 77 (Fig. 18) reaches a position opposite the cam 76 on the slide 75 simultaneously with the arrival of the first column which is to be skipped, in the analyzing position. At this time the operator depresses the skip key, moving the slide 75 to the right as viewed in Fig. 17, causing the cam 76 to ride up on the raised portion 77 and then in turn raising the escapement pawl 14 out of cooperation with the ratchet teeth 13. The pawl 15 is not moved into cooperation with the ratchet teeth so that the carriage is free to move to the left until the end of the raised portion 77 on the bar 78 reaches the position of the cam 76. The latter then rides off from the end of the portion 77 and permits the pawl 14 to re-engage the ratchet 13 to stop the movement of the carriage. The next column to be verified will then be in the sensing position. The operator then releases the skip key and permits the slide 75 to return to the left, as viewed in Fig. 17, to normal position.

The skip key may be associated with a feeler 28 and dummy punch 54 for verifying a perforation in the X position of any column. Wherever columns on a card are to be verified there will, of course, be no corresponding cam projection 77 on plate 78. In this instance, depression of the X key will effect operation of the feeding or escapement mechanism only when there is a corresponding perforation in the card and the feeding will be for only one column as in the case of any other key corresponding to a perforation.

Release key

If the operator discovers a mistake in the punching of a card he will remove this card and proceed with the verifying of another. In order to remove the card he releases the carriage so that it may move its full distance to the left. Also it is often necessary to verify only a certain number of columns on a card. As soon as these columns have been verified the operator releases the carriage so that it may move its full distance to the left and the card is then taken out and a new one inserted. The release mechanism for permitting this movement of the carriage is shown in Figs. 6 and 7. The release key 79 is connected by pin and slot to a spring-pressed bell crank 80 pivoted at 81 to a fixed part of the machine. The bell crank is provided with a pin 82 adapted to engage a flange 83 on a plate 84 slidably mounted on studs 85. Sliding plate 84 is provided with a pin 86 adapted when moved to the right to engage a sliding wire 87 which has a cam projection 88 toward its left end. When the release key is depressed it thus moves the sliding plate 84 to the right and with it the wire 87. This causes the cam 88 to raise slide 75 under the pawl 14. This in turn releases the card carriage so that it may move its full distance to the left. Also connected to the plate 84 by pin and slot 89 is the sliding link 38. The movement of the plate 84 to the right also moves the link 38 which by reason of its connection at 90 to an arm 95 fixed with respect to bar 35, rocks the latter about its pivot 36 to raise all of the fingers 28 above the card so that they will not interfere with the movement of the later. The pawl 39 locks the link 38 in this position as shown in Fig. 8. This holds the parts in their set position until the carriage has been returned to its position to the right with a new card. At this point, the wheel 41 as previously shown rocks the arm 42 and lifts the pawl 39 out of the notch in link 38. The springs 34 acting upon the feelers 28 then rock the latter downwardly against the card returning the bar 35 to its normal position.

In the normal operation of the machine, when the card carriage reaches the end of its travel to the left after the last column has been verified a pin 92 carried by the bar 7a engages the downward projection 93 on the wire 87 and restores the latter to its normal left hand position out from under the slide 75. The pin 92 at the same time engages a downward projection 94 of an arm 95 which is pivoted at 23 and has pin and slot connection at 90 with the link 38 as well as with arm 37. This rocks the arm 95 clockwise, moving the link 38 to the right where it is latched by pawl 39. It also rocks arm 37 to raise the bar 35, thus lifting all of the feeler fingers 28 above the card so that the latter may be removed and another one inserted. These parts as we have seen will be released when the carriage is returned to its right hand position. As shown in Figs. 3, 11 and 12, the fingers 6 which hold the card in position in the carriage are adjustably attached to the carriage by set screws 96. Also the fingers are constructed in the form of a comb so that after the card has been verified in the last column the fingers may continue on past the lower ends of the dummy punches 54 so as to entirely remove the card from under the punches.

In my aforesaid patent I disclosed ball locking means for preventing more than one key from being operated at a time. In my pending application Serial No. 2552 for key punches, filed January 15, 1925, I disclose pivoted locking means for the same purpose. Either of these locking devices may be employed in the present machine if desired. Also, it may be designed to permit two or some other number of keys to be depressed at a time or it may be made to permit only one key to be depressed and may have means for rendering it inoperative when several keys are to be depressed at once.

Figs. 20 and 21 show a modification in which a plurality of perforations as well as a single perforation in a single column may be verified by the depression of a single key. According to Fig. 20 the arm 49', which corresponds to the arm 49 of Fig. 4, is connected by pin and slot 100 to a bell crank 101 pivoted at 102 and connected at its other end to a slide 103.

Each key 46' is connected to a plate 104 adapted to slide up and down between frame plates or guide plates 105 (Fig. 21). A spring 106 tends to raise the key and hold it in its normal position. Each key plate 104 has a downward projection 107 cooperating with an arm 108 fixed in a shaft 109 adapted to rock in its bearings 110, 111. Each shaft 109 is provided with one or more arms 112 and each of these arms cooperates with a pin 113 on one of the slides 103. The depression of any one of keys 46' will thus rock a corresponding one of the shafts 109 and this in turn will move one or more of the slides 103 to the right as viewed in Fig. 20. The corresponding bell cranks 101 and arms 49' will thus be actuated.

Referring now to Fig. 4, the link or links 51 will act in the usual manner upon the arm 30 and sensing finger 28 and will effect the same operations that are effected in response to depression of one or more keys 46.

In Fig. 22 another modification is shown in which the device is adapted to verify perforations in a card in which the combinational hole system is employed. The card may be divided into an upper and a lower horizontal field of perforations each of these fields having a plurality of vertical columns of four hole positions to each column. One or more perforations in a column will be used to represent a numeral or other character. Depression of one of the keys 46' through the depending arm 107 will rock the corresponding shaft 109. Each shaft 109 is provided with one or more arms 112 to actuate one or more of the four slides 103. This in turn will actuate one or more of the arms 49'. In this modification four dummy punches 54 and four sensing fingers 28 are used. The operation of any one of the keys controls the operation of one or more of these dummy punches and sensing fingers. The rest of the operation of the machine is as disclosed heretofore. It is to be understood that in systems where combinations requiring other than four rows of hole positions are used, there will be a corresponding number of dummy punches and sensing fingers and the other parts will be correspondingly changed to carry the necessary number of cooperating elements.

Where the double deck card is used, as in connection with this modification, a special card supporting frame 114 may be employed having side guides 115. A link 116 connected to this card holding frame is connected to an arm 117 pivoted at 118. A crank 119 is adapted to rock the shaft 118 to move the frame 114 from its full line position to its dotted line position. This will move the card from one operating position to another. In one of these positions the upper horizontal field of perforations will be in position to be verified by the fingers and dummy punches and in the other position the other field will be in cooperation with these mechanisms for verification.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In a machine of the class described, means for feeding record cards having columns of perforations, means for sensing the perforations in each column as the card is fed through the machine, means controlled by the sensing means for causing operation of the feeding means and means operated by each sensing means for locking the feeding means against operation.

2. In a machine of the class described, means for feeding perforated record cards, sensing means adapted to sense perforations in the card, locking means controlled by each sensing means for locking the machine against operation and means operative when each sensing means which senses a perforation in a card is actuated for rendering said locking means inoperative and for causing operation of the feeding means.

3. In a machine of the class described, means for feeding a perforated record card through the machine, a plurality of sensing means adapted to sense perforations in the card, separate locking means controlled by each sensing means as the latter senses a perforation in the card for locking the feeding means against operation, a key associated with each sensing means, means associated with said keys and adapted when the keys corresponding with sensing means which have sensed perforations in the card are depressed for rendering said locking means inoperative, and means for causing said feeding means to operate when all of the locking means have been rendered inoperative.

4. In a machine of the class described, means for feeding a record card through the machine, a plurality of feelers adapted to rest upon the card as the latter is fed, means for resiliently pressing said feelers against the card so as to cause those that encounter perforations in the card to enter such perforations, a key associated with each feeler adapted when actuated to remove the feeler from the perforation and to effect operation of the feeding means.

5. In a machine of the class described, means for feeding a perforated record card through the machine, feelers adapted to engage the surface of a card being fed through the machine, means for causing a feeler which encounters a perforation in the card to enter therein, visual indicators controlled by said feelers, keys associated with said feelers for removing the latter from a perforation in the card and for restoring said visual entry to normal position.

6. In a machine of the class described, means for feeding a perforated record card through the machine, feelers adapted to engage the surface of a card being fed through the machine, means for causing a feeler which encounters a perforation in the card to enter therein, visual indicators controlled by said feelers, keys associated with said feelers for removing the latter from a perforation in the card and for restoring the indicators and means operated when a feeler is removed from the perforation for causing operation of the feeding means.

7. In a machine of the class described, means for feeding a card across the machine, means for analyzing perforations in successively presented columns on the card being fed and means operative when the card reaches the limit of its travel for moving said analyzing means to inoperative position.

8. In a machine of the class described, means for feeding record cards across the machine, means for sensing perforations in successively presented columns on a card being fed, a skip key, means controlled by the skip key adapted to cause the card to be fed a plurality of columns at a single operation and additional means operated by said skip key for moving said sensing means to inoperative position during said skip operation.

9. In a machine of the class described, means for feeding a record card across the machine, a plurality of sensing elements adapted to drop into perforations in a card as the latter is fed, a key associated with each sensing element and adapted when operated to raise such elements out of the perforations in the card, a pin associated with each of said elements and adapted to be moved into the perforation as the element is removed therefrom and means controlled by said pin when the latter enters a perforation in the card for causing operation of said feeding means.

10. In a perforated card verifying machine, means for feeding a perforated card across the machine column by column, a perforation sensing element adapted to drop into a perforation in the card as the latter is fed across the machine, means for lifting said element out of said perforation, a pin adapted to be moved into the perforation when the said element is removed therefrom, means for latching the feeding means against operation when a sensing element enters a perforation and adapted to release said feeding means for operation when said pin enters the perforation and means for causing said feeding means to operate when the pin enters a perforation.

11. In a machine of the class described, means for feeding a record card across the machine, perforation sensing elements adapted to trail over the card as the card is fed across the machine, an escapement mechanism associated with said feeding means for controlling the latter, means for simultaneously removing said sensing elements from cooperation with a card and for moving said escapement mechanism to inoperative position to permit the card to be fed to predetermined position in the machine, means operative when the card reaches such position for releasing said escapement mechanism for operation and means operative when a card is moved to another predetermined position in the machine for releasing said sensing means to permit the latter to cooperate with the card.

12. In a machine of the class described, means for feeding a perforated record column by column across the machine, perforation sensing elements adapted to trail upon the card being fed across the machine, escapement mechanism associated with said feeding means for controlling the latter, a release key adapted when depressed to move said escapement mechanism to inoperative position to permit the feeding means to operate and to simultaneously remove said sensing elements to inoperative position, means for locking said escapement mechanism and said sensing means in the positions to which they have been moved by said release key, means operative when the card reaches a predetermined position to release said escapement mechanism and means operative when a card is moved to predetermined position in the opposite direction for rendering said locking means inoperative.

13. In a machine of the class described, means for feeding a perforated card across the machine, perforation sensing element adapted to enter perforations as the card is fed across the machine, means operated by said sensing elements when the latter enter perforations in a card for locking said feeding means against operation, a space key, means operated by said key when depressed to render said locking means inoperative and means also operated by said key for causing said feeding means to operate.

14. In a machine of the class described, means for feeding a perforated record card step by step across the machine, means for sensing perforations in the card being fed and a space key adapted when operated to move all of said sensing means to inoperative positions and to cause said card to be fed one step across the machine.

In testimony whereof I hereto affix my signature.

JOHN THOMAS SCHAAFF.